United States Patent [19]
Larson et al.

[11] Patent Number: 4,997,074
[45] Date of Patent: Mar. 5, 1991

[54] CVT HYDRAULIC START CLUTCH

[75] Inventors: Craig S. Larson, Schaumburg; Maria S. Vlamakis, Justice, both of Ill.

[73] Assignee: Borg-Warner Automotive Transmission & Engine Components Corporation, Sterling Heights, Mich.

[21] Appl. No.: 419,986

[22] Filed: Oct. 11, 1989

[51] Int. Cl.$^5$ .................. F16D 25/0635; F16D 13/72
[52] U.S. Cl. .................. 192/70.28; 192/3.57; 192/85 AA; 192/113 B; 267/161
[58] Field of Search ........... 192/70.12, 70.28, 85 AA, 192/89 B, 113 B, 3.57; 267/161, 163

[56] References Cited

U.S. PATENT DOCUMENTS

| | | | |
|---|---|---|---|
| 3,259,383 | 7/1966 | Johnson et al. | 267/161 |
| 3,366,210 | 1/1968 | Webster | 192/113 B |
| 4,315,565 | 2/1982 | Low | 192/113 B |
| 4,520,912 | 6/1985 | Ferris et al. | 192/85 AA |
| 4,606,446 | 8/1986 | Watanabe | 192/0.076 |
| 4,624,349 | 11/1986 | Watanabe | 192/0.076 |
| 4,699,259 | 10/1987 | McColl | 192/70.12 |
| 4,706,789 | 11/1987 | McColl et al. | 192/0.075 |
| 4,709,795 | 12/1987 | Ferris | 192/106 F |
| 4,856,635 | 8/1989 | Vlamakis | 192/70.12 |

FOREIGN PATENT DOCUMENTS 940405 10/1963 United Kingdom.

Primary Examiner—Richard Lorence
Attorney, Agent, or Firm—James A. Geppert; Greg Dziegielewski

[57] ABSTRACT

A hydraulically-actuated starting clutch for a continuously variable transmission which is designed to reduce the centrifugal torque of the clutch with respect to the chain belt/sheave torque. This is accomplished by adjusting the diameters of the clutch piston to reduce the resultant clutch torque to a value lower than the chain belt/sheave torque. A pair of oil feed passages are positioned in the clutch assembly to feed oil through openings in the friction plate at all times during operation, even when rotation of the friction plate ceases. Further, an improved retractor spring is utilized in the clutch assembly with circumferentially extending tabs on its inner periphery which extend over the snap ring holding the spring onto the actuating piston to prevent release of the snap ring due to centrifugal force during operation of the clutch.

11 Claims, 3 Drawing Sheets

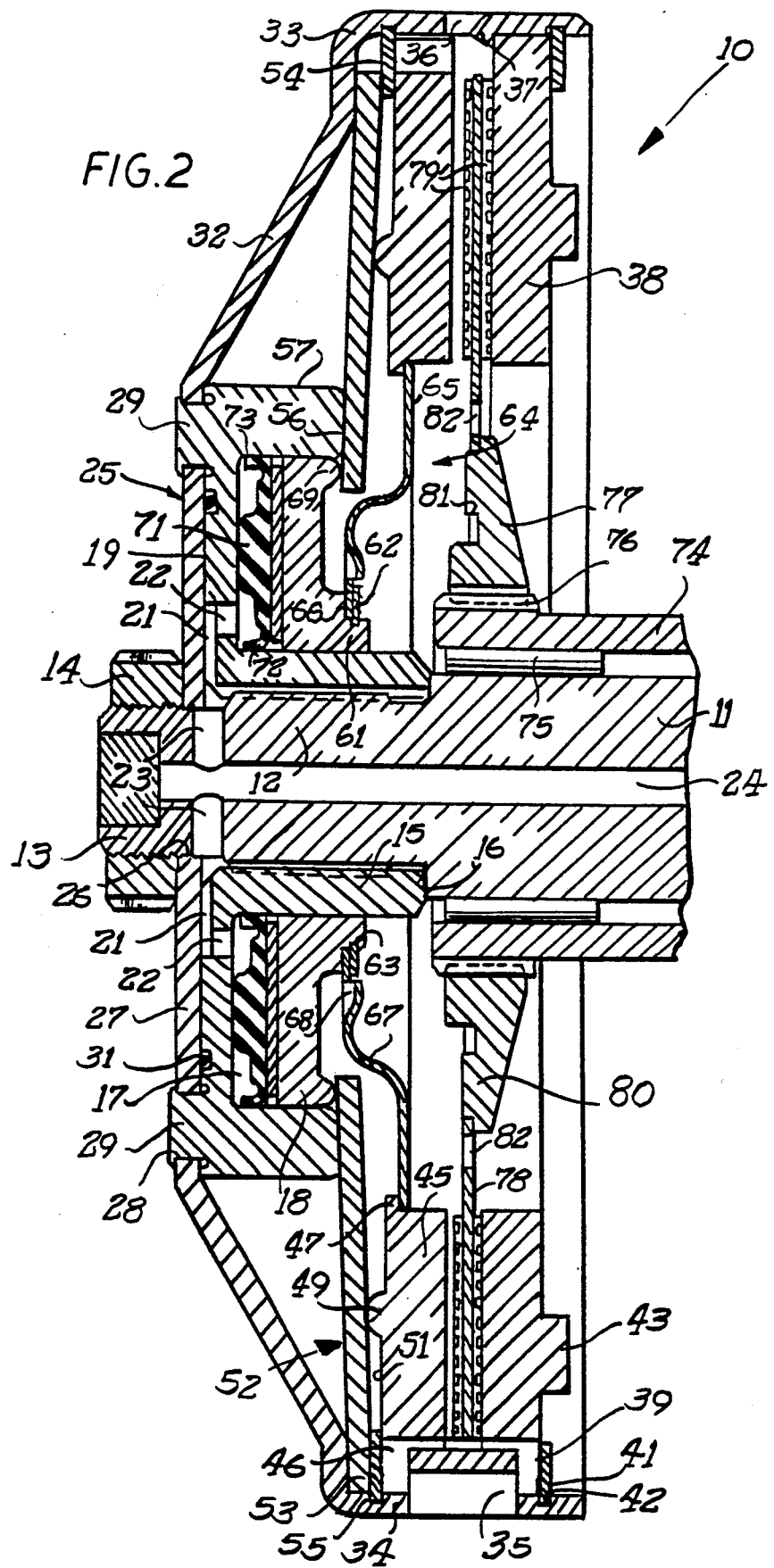

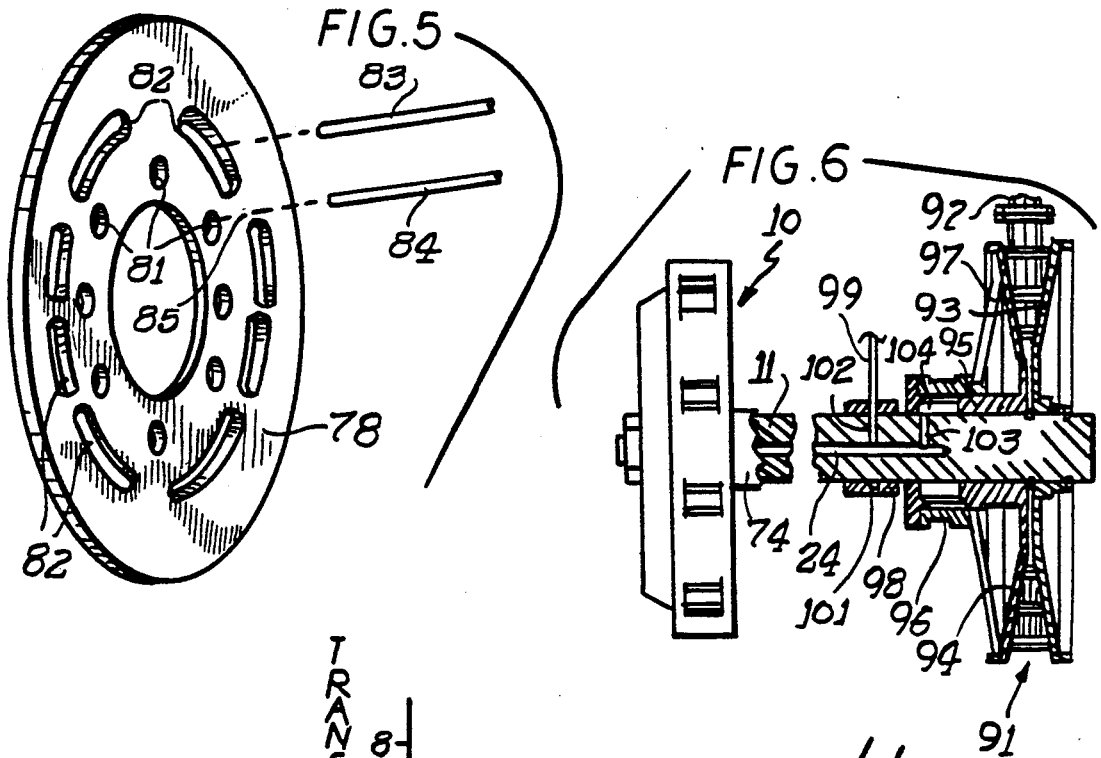
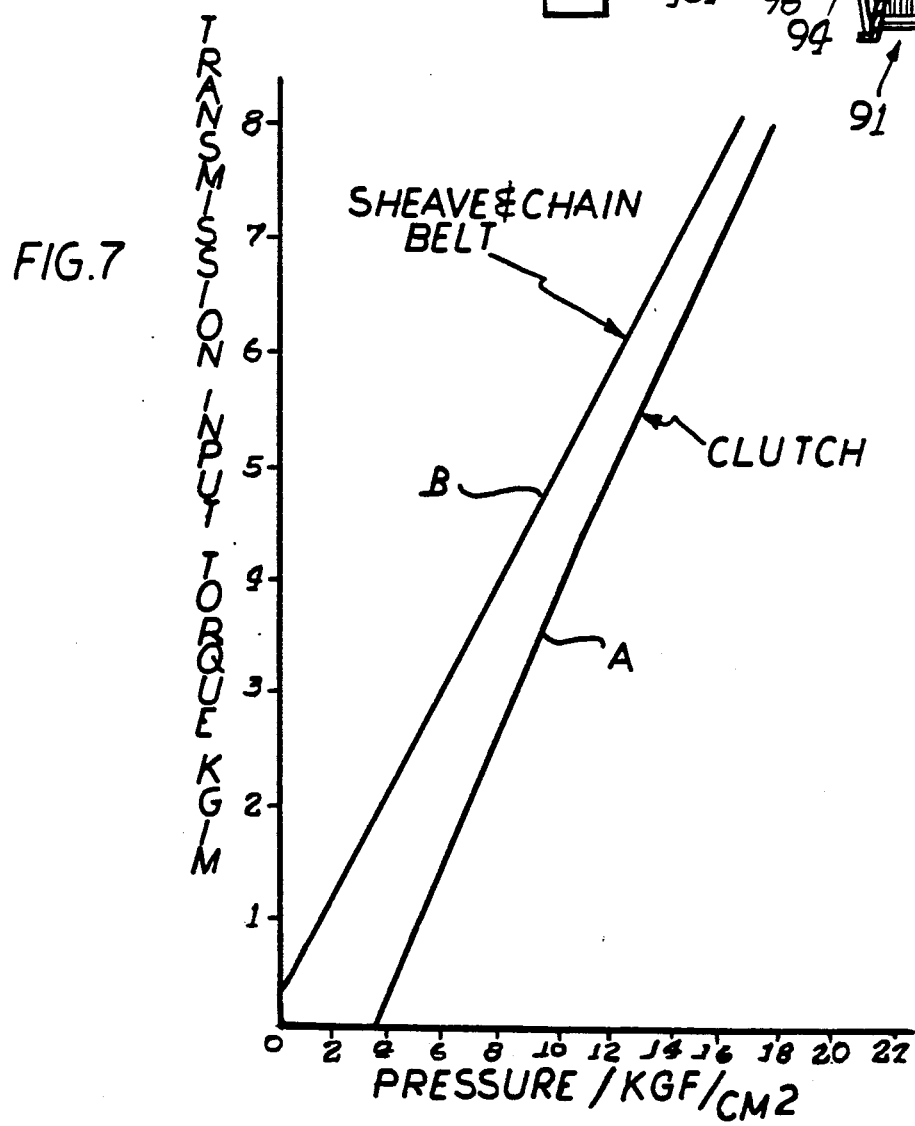

CVT HYDRAULIC START CLUTCH

TECHNICAL FIELD

The invention disclosed herein relates to a hydraulically actuated starting clutch utilized in a continuously variable transmission (CVT) wherein the transmission is used in an automotive vehicle as the driving means between the engine or driving force for the vehicle and the road engaging wheels.

BACKGROUND

Continuously variable transmissions have been known for a number of years as a driving means for the road engaging wheels of a vehicle to provide smooth acceleration without the usual shifting of gears by clutches and brake bands in an automatic transmission. A continuously variable transmission conventionally includes a pair of variable sheave pulleys, an endless belt extending between and in driving engagement with the pulleys and control means to alter the effective pulley diameters and thus change the belt ratio during operation of the vehicle.

In automotive applications, a hydraulically-actuated clutch is required on the driven pulley shaft as a starting device and for rotation of a shaft leading to the forward/reverse gearing to drive the final differential for the road-engaging wheels. The starting clutch is positioned on the driven pulley shaft so that the pulleys can be constantly rotating in one direction and rotation is not interrupted when shifting from forward to reverse and vice versa during vehicle operation. Thus, initiating movement of the vehicle is accomplished by a speed responsive friction starting device wherein a clutch is controlled by the hydraulic control means for the pulleys.

Prior patents relating to hydraulically-actuated starting clutches cover a broad base of applications. One prior problem of such starting clutches resided in the centrifugally generated oil head pressure developed at the clutch piston during operation. The start clutch has a basic torque curve plus a centrifugally added torque as a result of the centrifugally induced oil pressure on the piston at elevated speeds. The chain belt/sheaves have a similar arrangement. In the past to keep the clutch torque (basic plus centrifugal torque) below the chain belt/sheave torque (basic plus centrifugal), balance weights were added to the clutch Belleville spring to counter the influence of the centrifugal torque of the clutch (see U.S. Pat. No. 4,520,912), or a shroud was positioned either extending inwardly from the outer periphery of the clutch cover, as shown in U.S. Pat. No. 4,699,259, or at least partially covering the open end of the piston chamber leading into the actuating chamber for the clutch piston, such as seen in U.S. Pat. No. 4,556,556. This would keep the total torque of the clutch below the chain belt/sheave torque. Another problem was to provide a sufficient supply of cooling oil in the clutch compartment to adequately cool the friction surfaces of the clutch plate, especially during engagement and disengagement of the clutch where slippage occurs.

DISCLOSURE OF THE INVENTION

The present invention relates to an improved hydraulically-actuated starting clutch for a continuously variable transmission which has been redesigned to overcome the above mentioned problems. Specifically, to reduce the torque in the clutch, the piston diameters were adjusted to where the resultant centrifugal torque of the clutch was less than the centrifugal torque of the chain belt/sheaves, and the centrifugal balance weights which were on the Belleville spring have been omitted and/or the balance shroud was removed. Also, more direct cooling oil flow is obtained by eliminating the oil impeller at the open end of the clutch cover and adding a second oil supply feed to the clutch. Further, the retractor plate or spring utilized in the clutch assembly has been redesigned so that its inner periphery is secured to the circumference of the actuating piston in a novel manner.

BRIEF DESCRIPTION OF THE DRAWINGS

FIG. 2 is a cross sectional view of the starting clutch taken on the irregular line 2—2 of FIG. 1.

FIG. 5 is a perspective view of the oil feed system for the clutch plate.

FIG. 6 is a view partly in elevation and partly in cross section of the starting clutch and driven pulley on the driven shaft of the CVT.

FIG. 7 is a graph of torque vs pressure for the clutch and driven sheave.

BEST MODE OF CARRYING OUT THE INVENTION

Figure 1:
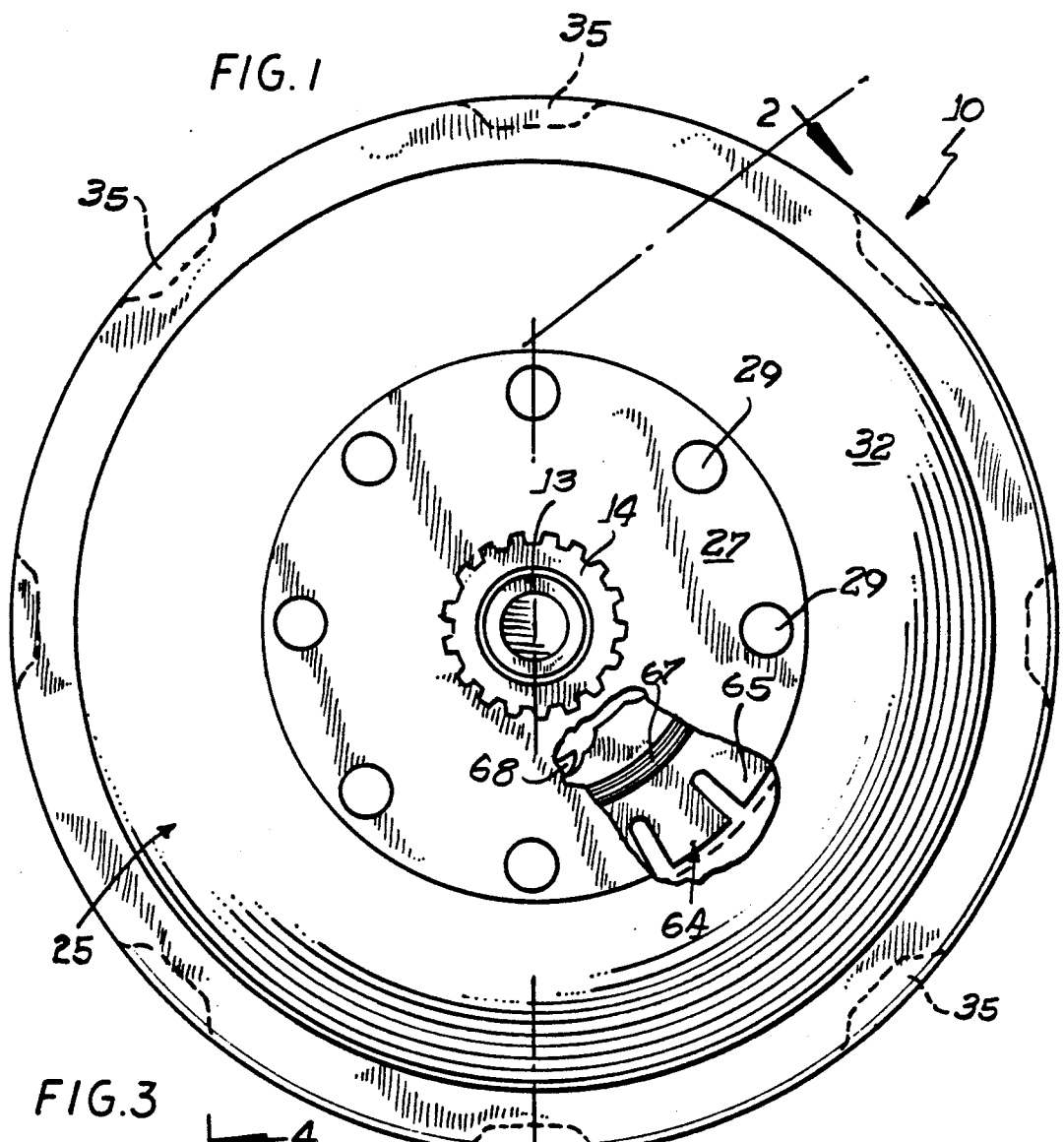
FIG. 1 is an end elevational view of the hydraulically-actuated starting clutch of the present invention with portions broken away to show the internal clutch structure.

Referring more particularly to the disclosure in the drawings wherein is shown the preferred embodiment of the present invention, FIGS. 1 and 2 disclose a hydraulically-actuated starting wet clutch 10 for use on a shaft 11 for a driven pulley 91 (FIG. 6) of a continuously variable transmission (CVT), such as partially illustrated in FIG. 6. The shaft 11 has a reduced diameter splined portion 12 terminating in a threaded end portion 13 for an internally threaded nut 14. An annular hub 15 having internal splines is received on the portion 12 to rotate therewith, with the inner hub end abutting a shoulder 16 defining the portion 12. The hub extends radially outwardly to form an annular pressure chamber 17 receiving an annular piston 18 for axial reciprocation therein. The face of the hub contains a plurality of radial passages 21 connected to openings 22 communicating with pressure chamber 17; the radially inner ends of passages 21 communicating with passages 23 in shaft 11 radiating from a central passage 24 therein. This passage 24 extends from the hub through the shaft 11 to a hydraulic control device for the driven pulley 91 (see FIG. 6).

A clutch housing or cover 25 is provided with a central opening 26 in a generally radial wall portion 27 to receive the threaded shaft end 13 and is secured to the shaft and hub by the nut 14. A plurality of circumferentially spaced openings 28 are formed in the wall 27 to receive projections 29 on the face 19 of the hub radially outwardly of the openings 22; the projections being headed over to further secure the hub and cover together. A resilient ring 31 is located in an annular groove in the hub face 19 to sealingly engage the cover. Beyond the projections 29, the cover wall extends radially outwardly and rearwardly toward the driven pulley 91 in an inclined portion 32 terminating in a corner 33 defining the intersection between the inclined wall and an axially extending, generally cylindrical outer wall or flange 34; the cover and the hub forming an enclosure for the clutch.

The flange 34 is formed with axially extending, internally flattened ribs 35 which extend partially along the outer flange 34 between the grooves 42 and 55, as will be later described. Also, the outer wall is provided with openings 36 for the circulation of cooling oil through the body of the clutch from adjacent the shaft 11 to exit from the openings, and tabs 37 formed in the openings 36 cooperating with and retaining an end plate 38 in the cover (FIG. 2). The end plate 38 has an outer periphery with circumferentially spaced channels 39 cooperating with the ribs 35 formed in the cover for rotation therewith. A snap ring 41 is located in an annular groove 42 adjacent the end of the cover flange 34 to cooperate with tabs 37 to retain the end plate in the cover; the tabs 37 being bent inwardly to axially secure the end plate in the clutch assembly. An annular rib 43 is formed on the back side of the end plate, which rib material may be removed in whole or in part for balancing the clutch assembly.

An axially reciprocable pressure plate 45 also is provided with axial channels 46 in its outer periphery, similar to the channels 39 in the end plate 38, cooperating with the ribs 35 to rotate with the cover, and an inner lip 47 is provided to interact with a retractor plate or spring 64. The pressure plate is formed with an annular fulcrum ridge 49 on its surface 51 engaged by an intermediate portion of a Belleville or diaphragm spring 52 having its outer edge 53 received in the corner 33 of the cover and retained therein by a snap ring 54 located in a second annular groove 55 in the cover. As clearly seen in FIG. 2, the internally flattened ribs terminate short of the grooves 42 and 55 in the cover outer wall and are formed by a shearing process. The inner portion of the spring 52 is divided into fingers 56 resting on the outer wall 57 of the hub defining the pressure chamber 17 when the piston is retracted.

Figure 3:
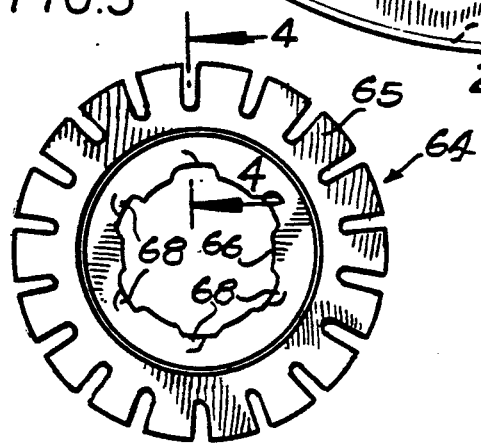
FIG. 3 is an elevational view of the retractor spring.
Figure 4:
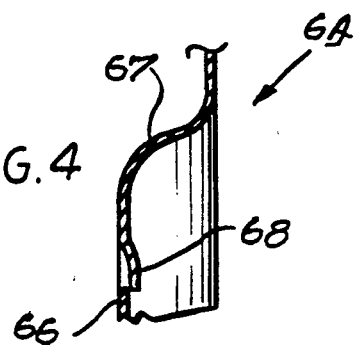
FIG. 4 is a enlarged partial cross sectional view of the spring taken on the line 4—4 of FIG. 3.

The piston 18 is formed with an inner hub ring 61 encompassing the hub 15 and having a snap ring 62 in a groove 63 therein retaining a retractor spring 64. The retractor spring is formed of sheet metal having an outer slotted edge 65 extending behind the pressure plate lip 47 and an inner edge 66 axially offset by a curved intermediate portion 67. Circumferentially oriented locating tabs 68 are stamped in pairs in the spring adjacent the inner periphery (FIGS. 3 AND 4) bent to extend over and closely encompass the periphery of the snap ring 62 so as to concentrically position the retractor spring on the snap ring and piston and prevent the snap ring from being disengaged from the groove 63 under centrifugal force. The locating tabs 68 may be arranged in pairs extending in opposite directions on the retractor spring 64. An annular rib or lip 69 is provided on the outer periphery of the piston 18 spaced outwardly from the inner hub ring 61 to engage the inner ends of the spring fingers 56. An annular resilient piston sealing ring 71 is located in the pressure chamber 17 behind the piston 18 with inner and outer sealing lips 72 and 73, respectively, engaging the chamber walls.

A sleeve shaft 74 encompasses and is concentric to the shaft 11 and is rotatably mounted thereon through needle bearings 75. The end of the sleeve shaft located within the cover is splined at 76 to receive a hub 77 for a clutch plate 78 having opposed friction facings 79, 79 which are grooved in a conventional waffle pattern; the clutch plate 78 being secured to the hub 77 through rivets or headed projections 80 extending through openings 81 in the plate. The sleeve shaft leads from the starting clutch to the final differential driving the road engaging wheels (not shown).

FIG. 2 discloses the starting clutch at idle rpm with the piston 18 retracted and the friction plate disengaged from the pressure plate and end plate. As the vehicle engine accelerates, the hydraulic pressure in the central passage 24 in shaft 11 increases, as well as the shaft rpm, with the increased pressure being transmitted through the radial passages 23 and 21 and openings 22 to the pressure chamber 17 behind the piston seal 71. The piston 18 is urged to the right, as seen in FIG. 2, with the piston urging the inner ends of the Belleville spring fingers 56 also to the right to pivot the spring about its outer edge 53 in the corner 33; the intermediate spring portion engaging the fulcrum ridge 49 on the pressure plate 45 to urge the pressure plate toward the clutch plate 78 and end plate 38 and engage the clutch, resulting in rotation of the sleeve shaft 74. When pressure is released, the Belleville spring 52 urges the piston to the left, the retractor spring 64 moves with the piston (since it is mounted on it) and retracts the pressure plate.

FIG. 5 is a perspective view of the inner portion of the clutch plate 78 showing the openings 81 and a plurality of circumferentially equally spaced elongated oil openings 82 to allow the flow of oil around the clutch plate and cool the friction facings 79. Cooling oil is fed by pressure from a suitable source through the two feed conduits 83 and 84. As seen, the two feed conduits are so spaced that, in the position shown, one conduit is directed toward the center of an opening 82 while the other conduit is directed toward the middle of the land 85 separating the openings. Thus, the orientation of the feed conduits is such that oil will always be able to pass through at least one opening 82 if the clutch plate stalls at any position during operation of the clutch.

FIG. 6 discloses the driven pulley 91 of the CVT which is driven through a suitable chain belt 92 from the drive pulley (not shown). The driven pulley includes a stationary side or face 93 and an axially movable side or face 94 on the shaft 11; the movable side having an annular piston 95 acting within a hydraulic cylinder 96 mounted on the shaft. A disc spring 97 is positioned between the cylinder and the movable side 94, and a non-rotatable delivery sleeve 98 encompasses the shaft and communicates with a hydraulic fluid source by conduit 99. The sleeve includes an inner annular groove 101 communicating with conduit 99 and a transverse bore 102 in the shaft; a second transverse bore 103 spaced from bore 102 communicates with the chamber 104 formed in the cylinder 96. The longitudinal bore 24 extends through the shaft 11 from the transverse bores 102 and 103 to the radial passages 23 in the clutch structure.

Hydraulic fluid under pressure is supplied from a throttle-induced pump (not shown) in the vehicle drive system through the conduit 99 extending into the sleeve 98 and communicating with the passage 24 to both actuate the pulley side 94 and the piston 18 in pressure chamber 17. Also, the complete assembly has a housing (not shown) encompassing the clutch assembly and CVT as well as the cooling oil source for conduits 83 and 84.

The Belleville spring 52 is so proportioned as to prevent clutch engagement until a predetermined piston pressure is developed as a consequence of throttle advance and enables the clutch to function as a "fuse" in a precise way. Considering FIG. 7, a graph is shown for the clutch where the hydraulic pressure for actuation of the clutch and the sheave is shown on the X axis and the transmission input torque for the clutch and sheave is shown on the Y axis. Line "A" is shown for the clutch and line "B" is shown for the sheave and chain belt. As slippage of the chain belt 92 will rapidly cause undesirable wear of the fixed and movable sheave faces engaging the belt, it is desirable that the starting clutch slip before any slippage of the belt relative to the sheave. Therefore, to keep the clutch torque (basic plus centrifugal) below the chain belt/sheave torque (basic plus centrifugal), the piston diameters for the clutch were adjusted to the point where the resultant centrifugal torque of the clutch was less than the centrifugal torque of the chain belt/sheaves, and the fuse concept was maintained without the use of balance weights or shrouds. Thus, the starting clutch operates through a range of pressure such that the differential between the torques for the sheave and belt and for the clutch decreases as the clutch operating pressure increases. Considering the graph of FIG. 7, at a particular pressure, for example 8.0 kilograms force per square centimeter, the torque for the clutch will be approximately 2.7 kilogram-meters, while the torque for the sheave will be approximately 4.2 kilogram-meters. This graph is shown for a particular CVT sheave ratio and other ratios will provide similar curves. It has been found that this fuse action will occur over substantially the entire pressure range for the clutch and sheaves except for extreme conditions of high drive ratios.

We claim:

1. In a starting clutch for a continuously variable transmission including a clutch housing, a driven shaft driving a hub in said housing, an actuating piston in said hub, a diaphragm spring pivotally mounted in the housing, an axially movable pressure plate having an inner edge, a stationary end plate, and a clutch plate between the pressure plate and end plate and mounted onto a sleeve shaft, all within said housing, the improvement comprising a retractor spring mounted in the clutch housing having an outer periphery engaging the inner edge of the pressure plate and an inner periphery secured onto the actuating piston by a snap ring in a groove in the piston, said snap ring having an outer edge, said retractor spring's inner periphery engaging the piston for concentric positioning thereof, and a plurality of circumferentially oriented tabs stamped in the retractor spring to prevent disengagement of the snap ring from the groove under centrifugal force.

2. In a starting clutch as claimed in claim 1, wherein said circumferential tabs adjacent the inner periphery are arranged in pairs extending in opposite directions.

3. In a starting clutch as claimed in claim 1, in which the inner edges of said tabs closely encompass the outer edge of said snap ring.

4. In a starting clutch as claimed in claim 1, in which the outer periphery of said retractor spring is slotted and axially offset from the inner periphery thereof to extend behind an inner lip of said pressure plate.

5. In a starting clutch as claimed in claim 3, wherein the spring tabs extend circumferentially around the piston and are curved rearwardly in the axial direction to extend over the outer edge of the snap ring.

6. In a starting clutch as claimed in claim 5, wherein the tabs extend across and beyond the snap ring when installed on the piston and have such resilience that even when they are deformed in assembly, they will return to extend over the snap ring.

7. In a starting clutch for a continuously variable transmission including a clutch cover secured to a central hub, a driven shaft for said hub, an annular pressure piston in said hub, a diaphragm spring pivotally mounted in said cover, a pressure plate rotatable with said cover, an end plate rotatable with said cover, a clutch plate between said pressure plate and end plate on a hub of a sleeve shaft leading to the drive wheels of a vehicle, said clutch plate having a plurality of circumferentially spaced oil feed openings therein, and a pair of spaced cooling oil feed conduits projecting towards said clutch plate to feed oil through said openings so that cooling oil is circulated along both sides of said clutch plate.

8. In a starting clutch as claimed in claim 7, wherein said oil feed conduits are so spaced that at least one conduit will project oil through at least one opening in said clutch plate.

9. In a starting clutch as claimed in claim 8, wherein the spacing for said conduits is such that at one position, one conduits is directed to the center of an opening and the other conduits is directed toward a land between the openings.

10. In a starting clutch as claimed in claim 7, wherein said circumferentially spaced oil feed openings are arcuately elongated to cooperate with said oil feed conduits.

11. A method of utilizing a starting clutch as a fuse in a continuously variable transmission wherein a secondary pulley is driven by a primary pulley through a chain belt and the starting clutch is operated through a range of pressure, the steps including providing the transmission input torque for the pulley and chain belt at a higher value than the torque for the starting clutch throughout the range of pressure for operation of the starting clutch such that the clutch will initiate slippage before slippage of the belt relative to the pulley, the torque differential between the torques for the sheave and belt and the clutch decreasing as the operating pressure increases.

* * * * *